United States Patent
Kanto (10) Patent No.: US 7,889,121 B2
(45) Date of Patent: Feb. 15, 2011

(54) TRANSMIT/RECEIVE MODULE

(75) Inventor: Kazuhiro Kanto, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 190 days.

(21) Appl. No.: 12/164,767

(22) Filed: Jun. 30, 2008

(65) Prior Publication Data
US 2009/0033547 A1 Feb. 5, 2009

(30) Foreign Application Priority Data
Jul. 30, 2007 (JP) ............................. 2007-197364

(51) Int. Cl.
*G01S 7/40* (2006.01)
*H04B 17/00* (2006.01)

(52) U.S. Cl. .................. 342/173; 342/175; 455/115.1; 455/226.1

(58) Field of Classification Search .............. 342/173
See application file for complete search history.

(56) References Cited

U.S. PATENT DOCUMENTS

| | | | |
|---|---|---|---|
| 5,412,414 A | 5/1995 | Ast et al. | |
| 5,835,850 A * | 11/1998 | Kumar | ................... 455/67.14 |
| 6,639,547 B2 * | 10/2003 | Solbach | ..................... 342/165 |
| 6,812,885 B2 * | 11/2004 | Brettner et al. | ............. 342/173 |
| 7,292,182 B2 * | 11/2007 | Quievy | ........................ 342/174 |

FOREIGN PATENT DOCUMENTS

| | | |
|---|---|---|
| JP | 50-31873 | 7/1973 |
| JP | 64-57186 | 3/1989 |
| JP | 2-112780 | 4/1990 |
| JP | 2-266280 | 10/1990 |
| JP | 2001-144697 | 5/2001 |
| JP | 2001-330660 | 11/2001 |
| JP | 2003-218811 | 7/2003 |

* cited by examiner

*Primary Examiner*—Thomas H Tarcza
*Assistant Examiner*—Matthew M Barker
(74) *Attorney, Agent, or Firm*—Oblon, Spivak, McClelland, Maier & Neustadt, L.L.P.

(57) ABSTRACT

A transmit/receive module that reduces size and weight of a radar apparatus is disclosed. The transmit/receive module includes a transmit input terminal, a receive output terminal, a transmit line, a receive line, and a plurality of branch devices. During monitoring of the transmit line, the plural branch devices are configured so that a standard signal inputted to the transmitting terminal passes through the transmit line, and is outputted to the receive output terminal. During monitoring of the receive line, the plural branch devices are configured so that the standard signal inputted to the transmitting terminal passes through the receive line, and is outputted to the receive output terminal.

17 Claims, 7 Drawing Sheets

TRANSMIT/RECEIVE MODULE

CROSS REFERENCE TO RELATED APPLICATION

This application is based upon and claims the benefit of priority from the Japanese Patent Application No. 2007-197364, filed on Jul. 30, 2007, the entire content of which is incorporated herein by reference.

FIELD OF THE INVENTION

The invention relates to a transmit/receive module used in, for example, a radar apparatus using a phased-array antenna. More particularly the invention is directed to a transmit/receive module having circuits for monitoring a transmit line and a receive line.

DESCRIPTION OF THE BACKGROUND

Generally a transmit/receive module used in a radar apparatus has circuits for monitoring a transmit line and monitoring a receive line as well as circuits for amplifying a transmit signal and amplifying a receive signal.

Figure 12:
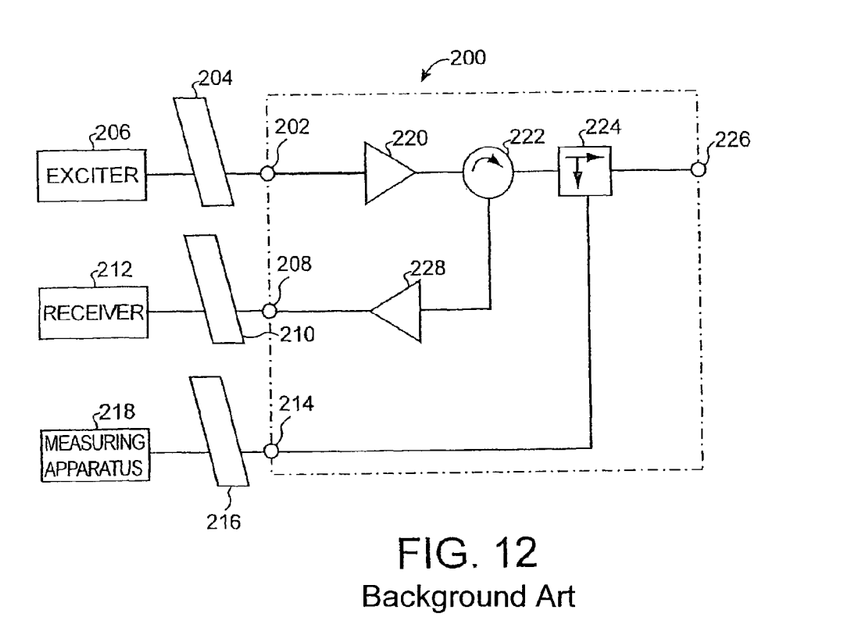
FIG. 12 is a block diagram showing a circuit structure of a transmit/receive module according to the conventional apparatus.

FIG. 12 shows a conventional transmit/receive module. In transmit/receive module 200, transmit input terminal 202 is connected to exciter 206 via power distributor 204, receive output terminal 208 is connected to receiver 212 via power combiner 210 and monitoring input/output terminal 214 is connected to measurement apparatus 218 via power distributor/combiner 216. Transmit output/receive input terminal 226 is connected to an antenna (not shown).

A plurality of transmit/receive modules (not shown) are provided. Each of the transmit input terminals is connected to power distributor 204, each of receive terminals is connected to power combiner 210 and each of monitoring input/output terminals is connected to power distributor/combiner 216.

During transmitting, a transmit signal inputted to transmit input terminal 202 via power distributor 204 from exciter 206 is amplified by transmit amplifier 220, and is outputted to transmit output/receive input terminal 226 via transmit/receive separator 222 and branch device 224.

During receiving, a signal inputted to transmit output/receive input terminal 226 is amplified by receive amplifier 228 via branch device 224 and transmit/receive separator 222, and is outputted to receive output terminal 208 and is inputted to receiver 212 via power combiner 210.

During monitoring a transmit line and a receive line, a measurement apparatus, for example, is used instead of exciter 206 and receiver 212. During monitoring the transmit line, a standard signal is inputted to transmit input terminal 202 via power distributor 204 from the measurement apparatus (not shown). A part of amplified standard signal is outputted to monitoring input/output terminal 214 through the transmit amplifier 220, transmit/receive separator 222, and branch device 224. And amplified standard signal is inputted to measurement apparatus 218 via power distributor/combiner 216 connected to monitoring input/output terminal 214, and a gain of transmit amplifier 220 and passband phase characteristic, etc. are monitored by measurement apparatus 218.

During monitoring a receive line, the standard signal is inputted to monitoring input/output terminal 214 via power distributor/combiner 216 from measurement apparatus 218. An amplified standard signal is outputted to receive terminal 208 through branch device 224, transmit/receive separator 222, and receive amplifier 228. And amplified standard signal is inputted to a measurement apparatus (not shown) via power combiner 210 connected to receive output terminal 208, and a gain of receive amplifier 228 and passband phase characteristic, etc. are monitored by the measurement apparatus.

According to existing transmit/receive module 200, monitoring input/output terminal 214 only for measuring apparatus is required, and power distributor/combiner 216 only for measuring apparatus is still required outside. For this reason, the radar apparatus becomes large and there is a problem that reduction in size and weight of the radar apparatus is difficult.

SUMMARY OF THE INVENTION

A transmit/receive module includes a transmit input terminal for inputting a transmit input signal, a receive output terminal for outputting a receive output signal; a transmit output/receive input terminal for outputting a transmit signal and receiving a receive signal, a first branch device connected to the transmit input terminal, a transmit/receive separator connected to the first branch device, a second branch device connected to the transmit/receive separator, a third branch device connected to the first branch device and the second branch device, and a fourth branch device connected to the third branch device, and the receive output terminal and the transmit/receive separator. The first branch device, the second apparatus, the third branch device, the fourth branch device and the transmit/receive separator are configured such that during monitoring a transmit line, a signal inputted to the transmit input terminal is outputted to the receive output terminal through the first branch device, the transmit/receive separator, the second branch device, the third branch device and the forth branch device in order, and during monitoring a receive line, the signal inputted to the transmit input terminal is outputted to the receive output terminal through the first branch device, the third branch device, the second branch device, the transmit/receive separator, and the fourth branch device in order.

DETAILED DESCRIPTION OF THE INVENTION

The accompanying drawings, which are incorporated in and constitute a part of this specification, illustrate several embodiments of the invention and together with the description, serve to explain the principles of the invention.

Figure 1:
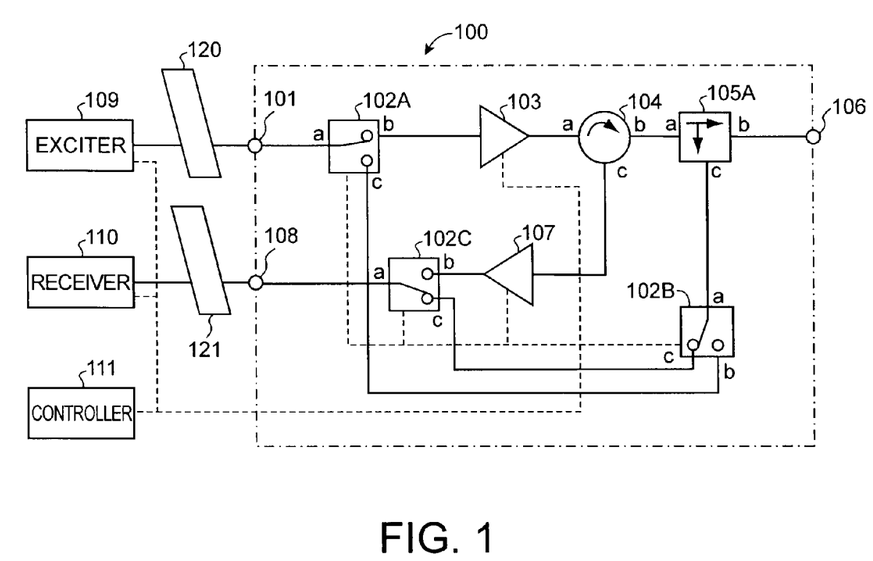
FIG. 1 is a block diagram showing a circuit structure of a transmit/receive module according to a first embodiment.

FIG. 1 is a block diagram showing the circuit diagram of a transmit/receive module of the first embodiment. In transmit/receive module 100, common terminal a of first branch device 102A which branches an inputted signal into two directions is connected to transmit input terminal 101, and terminal b of first branch device 102A is connected to transmit amplifier 103. Output of transmit amplifier 103 is connected to terminal a of transmit/receive separator 104 which changes a terminal outputting a signal according to a terminal inputted with the signal, and terminal b of transmit/receive separator 104 is connected to terminal a of second branch device 105A. Terminal b of second branch device 105A is connected to transmit output/receive input terminal 106.

Terminal c of second branch device 105A is connected to common terminal a of third branch device 102B, terminal b of third branch device 102B is connected to terminal c of first branch device 102A, and terminal c of third branch device 102B is connected to terminal c of fourth branch device 102C. Terminal c of transmit/receive separator 104 is connected to receive amplifier 107, output of receive amplifier 107 is connected to terminal b of fourth branch device 102C, and common terminal a of fourth branch device 102C is connected to receive output terminal 108.

Transmit input terminal 101 is connected to exciter 109 via power distributor 120, and receive output terminal 108 is connected to receiver 110 via power combiner 121. Controller 111 is connected to transmit amplifier 103, receive amplifier 107, branch devices 102A, 102B, 102C, exciter 109 and receiver 110.

According to this embodiment, first branch device 102A, third branch device 102B and fourth branch device 102C are formed with an RF switch respectively, second branch device 105A is formed with a directional coupler, and transmit/receive separator is formed with a circulator.

Operation of transmit/receive module 100 is as follows: During transmitting, a transmit circuit is configured by a circuit of exciter 109-power distributor 120-transmit input terminal 101-first branch device 102A-transmit amplifier 103-transmit/receive separator 104-second branch device 105A-transmit output/receive input terminal 106. That is, it is constituted so that a signal inputted into transmit input terminal 101 from exciter 109 is amplified by transmit amplifier 103 and amplified signal is outputted to transmit output/receive input terminal 106. In this case, common terminal a of first branch device 102A is connected to terminal b. Common terminal a of third branch device 102B is connected to one of terminals b and c. Common terminal a of fourth branch device 102C is connected to terminal c.

During receiving, a configuration becomes as follows: A receiver circuit is configured by a circuit of transmit output/receive input terminal 106-second branch device 105A-transmit/receive separator 104-receive amplifier 107-fourth branch device 102C-receive output terminal 108-power combiner 121-receiver 110. That is, it is constituted so that a received signal inputted into transmit output/receive input terminal 106 is amplified by receive amplifier 107 and amplified signal is outputted to receive output terminal 108. In this case, common terminal a of first branch device 102A is connected to terminal c. Common terminal a of fourth branch device 102C is connected to terminal b. Common terminal a of third branch device 102B is connected to terminals b.

During monitoring a transmit line, a transmit line monitoring circuit is configured by a circuit of exciter 109-power distributor 120-transmit input terminal 101-first branch device 102A-transmit amplifier 103-transmit/receive separator 104-second branch device 105A-third branch device 102B-fourth branch device 102C-receive output terminal 108-power combiner 120-receiver 110. That is, it is constituted so that a transmit signal inputted into transmit input terminal 101 from exciter 109, which functions as a source of a standard signal, is amplified by transmit amplifier 103 and amplified signal is outputted to receive output terminal 108 through second branch device 105A, third branch device 102B and fourth branch device 102C. And a gain of transmit amplifier 103 and a passband phase characteristic of the transmit line is measured by receiver 110 used as a measuring apparatus. In this case, common terminal a of first branch device 102A is connected to terminal b. Common terminal a of third branch 102B is connected to terminals c. Common terminal a of fourth branch device 102C is connected to terminal c.

During monitoring a receive line, a receive line monitoring circuit is configured by a circuit of exciter 109-power distributor 120-transmit input terminal 101-first branch device 102A-third branch device 102B-second branch device 105A-transmit/receive separator 104-receive amplifier 107-fourth branch device 102C-receive output terminal 108-power combiner 121-receiver 110. That is, it is constituted so that a signal inputted into transmit input terminal 101 from exciter 109, which functions as a source of a standard signal, is branched to third branch device 102B by first branch device 102A, and is amplified by receive amplifier 107 through second branch device 105A and transmit/receive separator 104, and amplified signal is outputted to receive output terminal 108 through fourth branch device 102C. And a gain of receive amplifier 107 and a passband phase characteristic of the receive line is measured by receiver 110 used as a measuring apparatus. In this case, common terminal a of first branch device 102A is connected to terminal c. Common terminal a of third branch 102B is connected to terminals b. Common terminal a of fourth branch device 102C is connected to terminal b.

As mentioned above, in the transmit/receive module according to the first embodiment, during both monitoring the transmit line and monitoring the receive line, transmit input terminal 101 is used for inputting a signal from external, and receive output terminal 108 is used for outputting a signal to external. For this reason, the monitoring input/output terminal only for measuring apparatus provided in the conventional apparatus shown in FIG. 12 becomes unnecessary, and the power distributor/combiner only for measurement apparatus also becomes unnecessary and a radar apparatus can be reduced in size and weight.

The directional coupler and the RF switches used in the first embodiment will be explained. A so-called coupler can be used as the directional coupler. The directional coupler is a part which outputs a signal inputted from a first terminal to a second and third terminals. This input-output direction is reversible. As the directional coupler used in a high frequency circuit, there are directional couplers using a wave guide or a microstrip line, which can be chosen suitably. The RF switch is a switch which selection of a connection line can be controlled electrically and is also called a SPDT (Single Pole Dual Throw) switch. As shown in FIG. 1, controller 111 is provided and RF switches are controlled by controller 111.

Controller 111 adds control signals shown in broken lines, to the RF switches constituting first branch device 102A, third branch device 102B and fourth branch device 102C to control to make a connection between each of common terminals a and either of each of terminals b or each of terminals c.

Controller 111 includes, for example, a CPU, a memory, an input/output section, etc. Controller 111 controls the RF switches constituting each branch devices, so as to form the transmit circuit when a signal is transmitted, to form the receive circuit when a signal is received, to form a transmit line monitoring circuit when the transmit line is monitored, and to form receive line monitoring circuit when the receive line is monitored as mentioned above. Controller 111 also controls operation of exciter 109 and receiver 110 according to operation of transmit/receive module 100.

As for transmit amplifier 103 and receive amplifier 107, it is desirable to provide controller 111 and to control operation of amplifiers 103 and 107, regardless of whether the RF switch is used for the branch device or not. That is, controller 111 controls as follows:

Transmit amplifier 103 is controlled to operate during transmission and during monitoring of the transmit line, and is controlled not to operate during receiving and monitoring the receive line. Receive amplifier 103 is controlled not to operate during transmission and during monitoring of the transmit line, and is controlled to operate during reception and during monitoring of the receive line.

According to above embodiment, during monitoring of the transmit line and during monitoring of the receive line, although a signal from exciter 109 is used as a standard signal, a standard signal generator may be used instead of exciter 109 and a standard signal from the standard signal generator may be used. Moreover, although receiver 110 measures gain of transmit amplifier 103, gain of receive amplifier 107, a pass-band phase characteristic of the transmit line and the receive line, a measuring apparatus is used instead of receiver 110.

Although above embodiment is provided with receive amplifier 107, terminal c of transmit/receive separator 104 and terminal b of fourth branch device 102C can be connected without providing receive amplifier 107. Although above embodiment is also provided with transmit amplifier 103, terminal b of first branch device 102A and terminal a of transmit/receive separator 104 can be connected without providing transmit amplifier 103.

Furthermore, all or any one of first branch device 102A, second branch device 105A and third branch device 102B may be formed of directional coupler. All or any one of branch devices 102A, 105A, 102B and 102C may be formed of the RF switch.

Furthermore, all or any one of branch devices 102A, 105A, 102B and 102C may use a distributor. As for the distributor, a distributor generally used in a high frequency circuit can be used. When the distributor is used, controller 111 is provided as shown in FIG. 1, and controller 111 is configured to control operation of exciter 109, receiver 110, transmit amplifier 103 and receive amplifier 107 by adding control signal as shown in broken lines. When the RF switch is used with the distributor, controller 111 is configured to control the RF switch.

Figure 13:
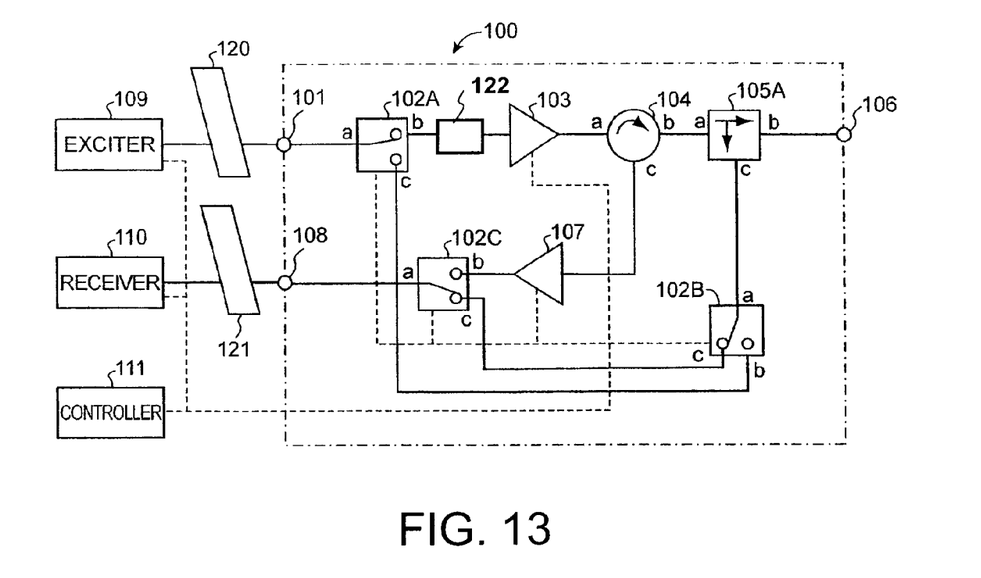
FIG. 13 is a block diagram showing a circuit structure of a transmit/receive module including a phase shifter.

Furthermore, a phase shifter 122 can be provided between first branch device 102A and transmit amplifier 103, as shown in FIG. 13.

Although transmit/receive separator 104 is formed of one circulator, transmit/receive separator 104 may be constituted of a 4-ports circulator containing two circulators of which rotational directions differ from each other. Furthermore transmit/receive separator 104 may be configured to include the RF switch. In this case the RF switch of transmit/receive separator 104 is configured to be controlled by controller 111.

Next, the transmit/receive module according to the second through the ninth embodiments will be explained. The branch devices and the transmit/receive separator in the transmit/receive module of the first embodiment are changed to other structure in those embodiments.

In the transmit/receive module according to the second though the ninth embodiments shown in FIGS. 2 through 9, the same numerals denote the same portion of the transmit/receive module shown FIG. 1 and the detailed explanation of those elements are omitted.

Figure 2:
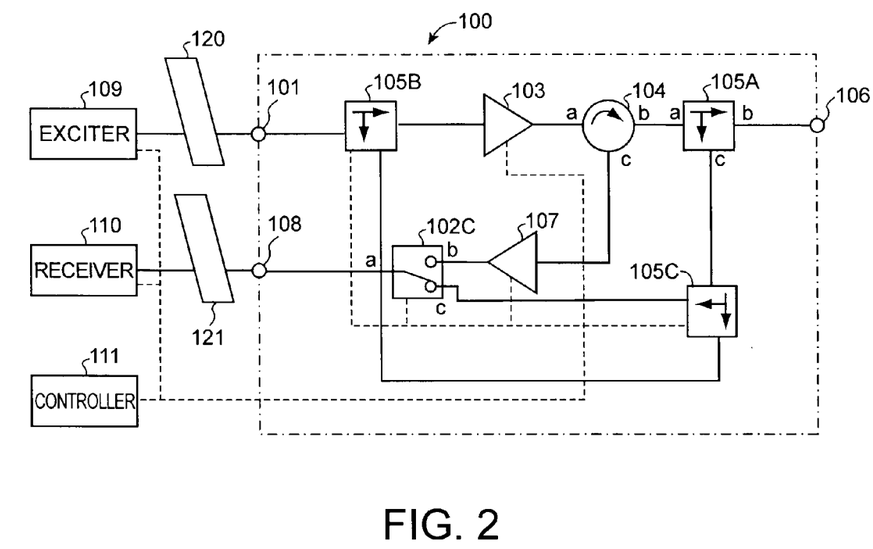
FIG. 2 is a block diagram showing a circuit structure of a transmit/receive module according to a second embodiment.

In transmit/receive module 100 shown in FIG. 2, first branch device 105B, second branch device 105A and third branch device 105C are directional couplers, and fourth branch device 102C is an RF switch, further transmit/receive separator 104 is a circulator.

Figure 3:
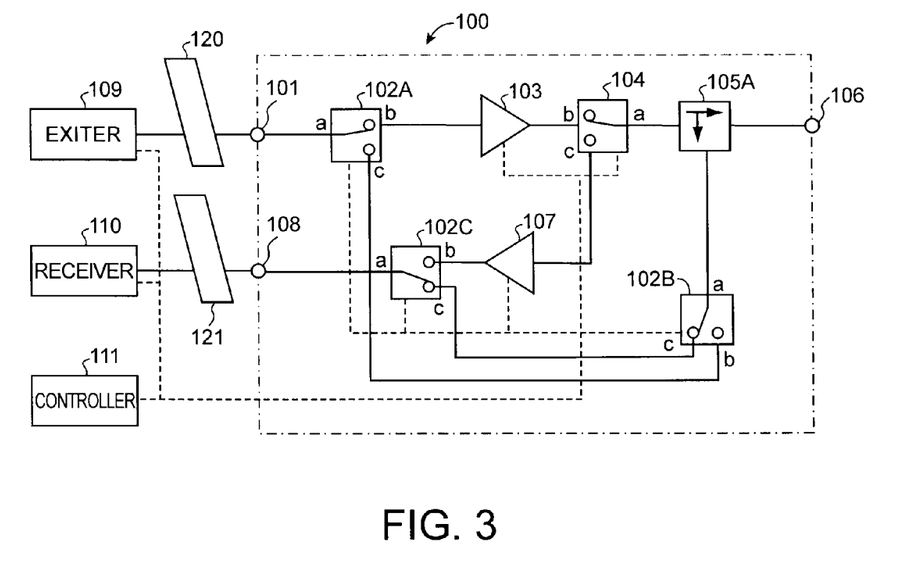
FIG. 3 is a block diagram showing a circuit structure of a transmit/receive module according to a third embodiment.

FIG. 3 shows the transmit/receive module according to the third embodiment. In transmit/receive module 100, second branch device 105A is a directional coupler, first branch device 102A, third branch device 102B and fourth branch device 102C are RF switches, and further transmit/receive separator 104 is an RF switch. In this case, in RF switch constituting transmit/receive separator 104, during transmission or monitoring of the transmit line common terminal a of the RF switch of transmit/receive separator 104 is connected to terminal b, and during reception or monitoring of the receive line common terminal a of the RF switch of transmit/receive separator 104 is connected to terminal c.

Figure 4:
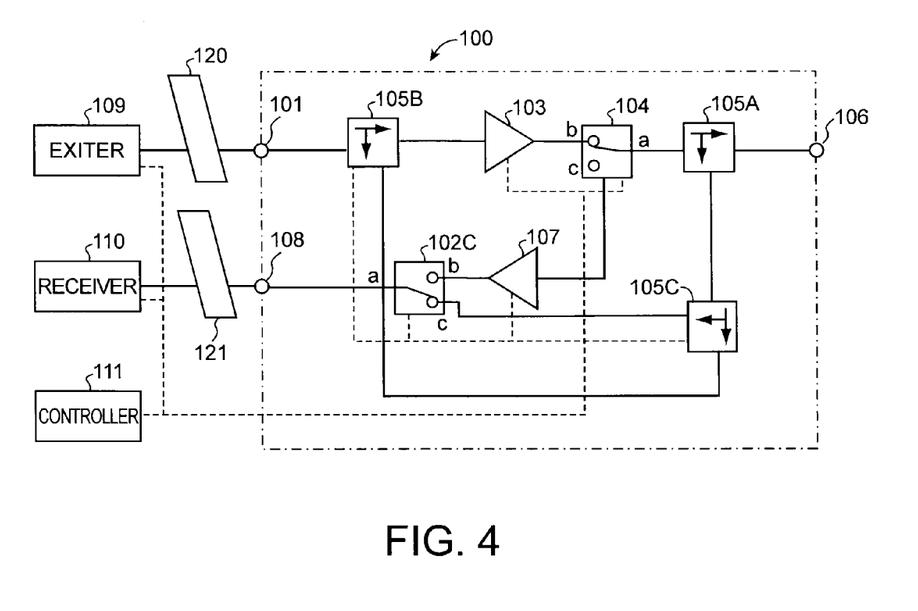
FIG. 4 is a block diagram showing a circuit structure of a transmit/receive module according to a fourth embodiment.

FIG. 4 shows the transmit/receive module according to the fourth embodiment. In transmit/receive module 100, first branch device 105B, second branch device 105A and third branch device 105C are directional couplers, fourth branch device 102C is an RF switch, and transmit/receive separator 104 is an RF switch.

Figure 5:
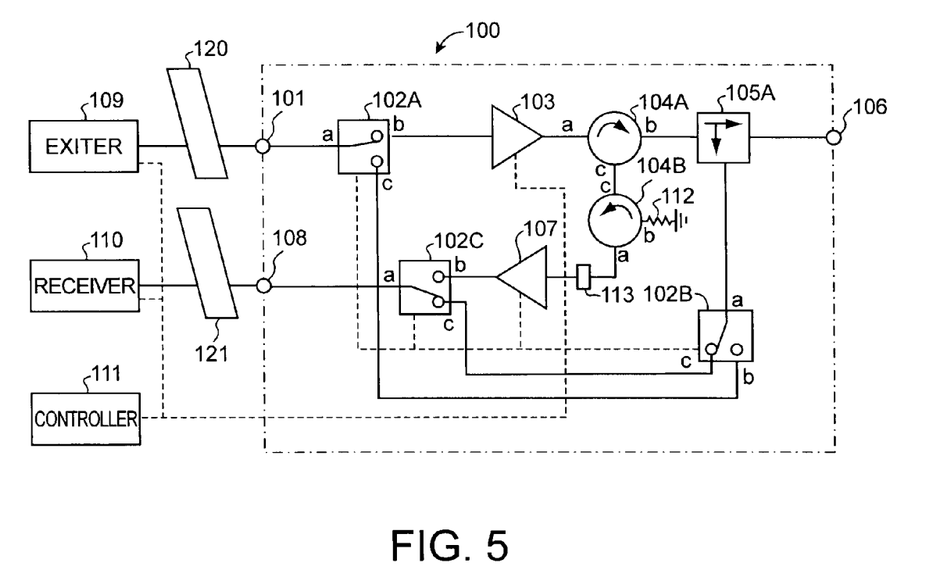
FIG. 5 is a block diagram showing a circuit structure of a transmit/receive module according to a fifth embodiment.

FIG. 5 shows the transmit/receive module according to the fifth embodiment. In transmit/receive module 100, second branch device 105A is a directional coupler, first branch device 102A, third branch device 102B and fourth branch device are RF switches, and transmit/receive separator 104 is a 4-ports circulator.

The 4-ports circulator is formed of clockwise circulator 104A and counterclockwise circulator 104B. Clockwise circulator 104A outputs a signal to a next terminal of a clockwise rotation of a terminal into which the signal is inputted. Counterclockwise circulator 104B outputs a signal to a next terminal of a counterclockwise rotation of a terminal into which the signal is inputted. Circulator 104A is located between transmit amplifier 103 and second branch device 105A, terminal a is connected to transmit amplifier 103 and terminal b which is a next terminal of a clockwise rotation of a terminal a, is connected to second branch device 105A. Terminal c of circulator 104A is connected to terminal c of circulator 104B. Terminal b of circulator 104B is terminated by resister 112, and terminal a which is previous to terminal b in rotational direction, is connected to receive amplifier 107 via limiter 113 which reflects excessive power. Thus, by constituting the 4-ports circulator, it can prevent the excessive power which flows into receive amplifier 107.

Figure 6:
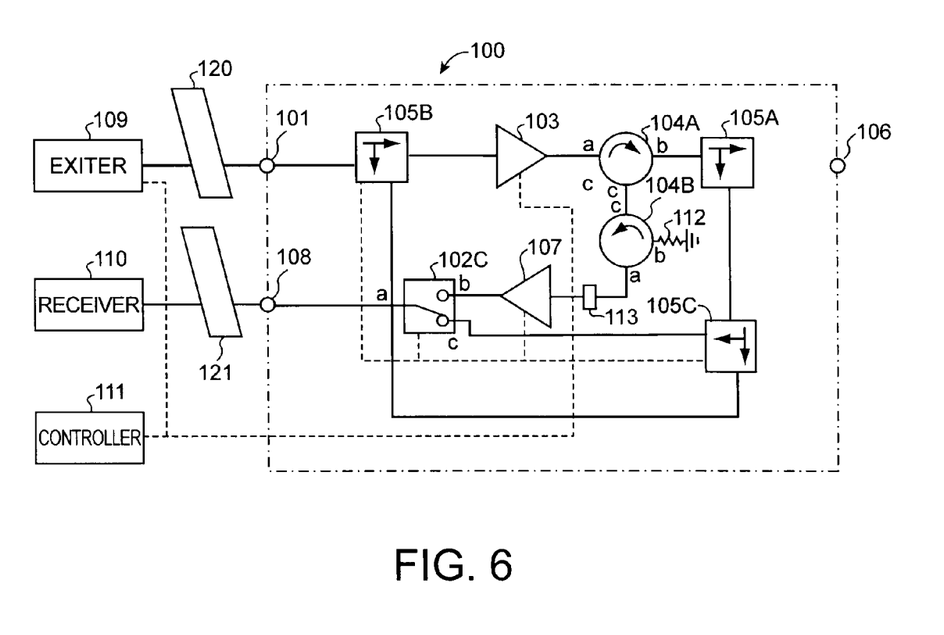
FIG. 6 is a block diagram showing a circuit structure of a transmit/receive module according to a sixth embodiment.

FIG. 6 shows the transmit/receive module according to the sixth embodiment. In transmit/receive module 100, first branch device 105B, second branch device 105A and third branch device 105C are directional couplers, fourth branch device 105C is an RF switch and transmit/receive separator 104 is a 4-ports circulator.

Next, the transmit/receive modules according to the seventh embodiment, the eighth embodiment and ninth embodiment will be explained. In those embodiments methods for controlling transmit amplifier 103 and receive amplifier 107 are different from that of the first embodiment shown in FIG. 1.

Figure 7:
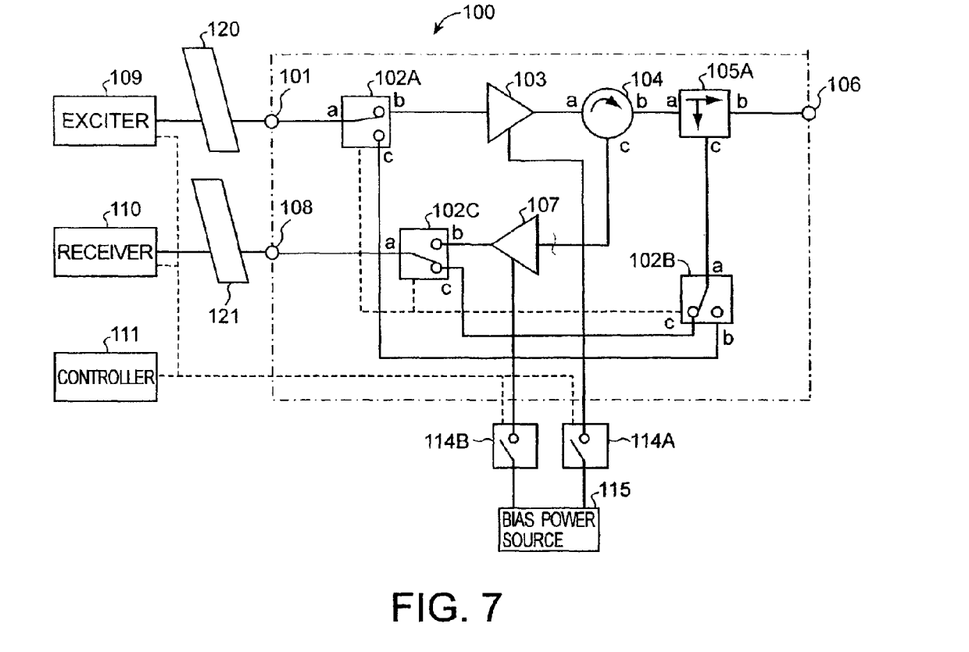
FIG. 7 is a block diagram showing a circuit structure of a transmit/receive module according to a seventh embodiment.

FIG. 7 shows the transmit/receive module according to the seventh embodiment. Bias power source 115 supplying bias voltages is provided outside, and transmit amplifier 103 and receive amplifier 107 are controlled by applying bias voltage and not applying bias voltage.

First power switch 114A is provided between transmit amplifier 103 and bias power source 115, and second power switch 114B is provided between receive amplifier 107 and bias power source 115. ON/OFF of power switches 114A and 114B are controlled electronically. First power switch 114A is set to ON during transmission or monitoring of the transmit line, and the bias voltage is applied to transmit amplifier 103 and transmit amplifier 103 operates. On the other hand, during reception or monitoring of the receive line, first power switch 114A is set to OFF, and bias voltage is not applied to transmit amplifier 103, and transmit amplifier 103 does not operate. First switch 114A is controlled as mentioned above by controller 111. Second power switch is set to OFF during transmission or monitoring of the transmit line, and the bias voltage is not applied to receive amplifier 107 and receive amplifier 107 does not operate. On the other hand, during reception or monitoring of the receive line, the bias voltage is applied to receiver amplifier 107, and receive amplifier 107 operates. Second switch 114B is controlled as mentioned above by controller 111. In addition, operation of transmit amplifier 103 and receive amplifier 107 is also controllable by applying a high level/a low level of the bias voltage instead of applying/not applying the bias voltage.

Figure 8:
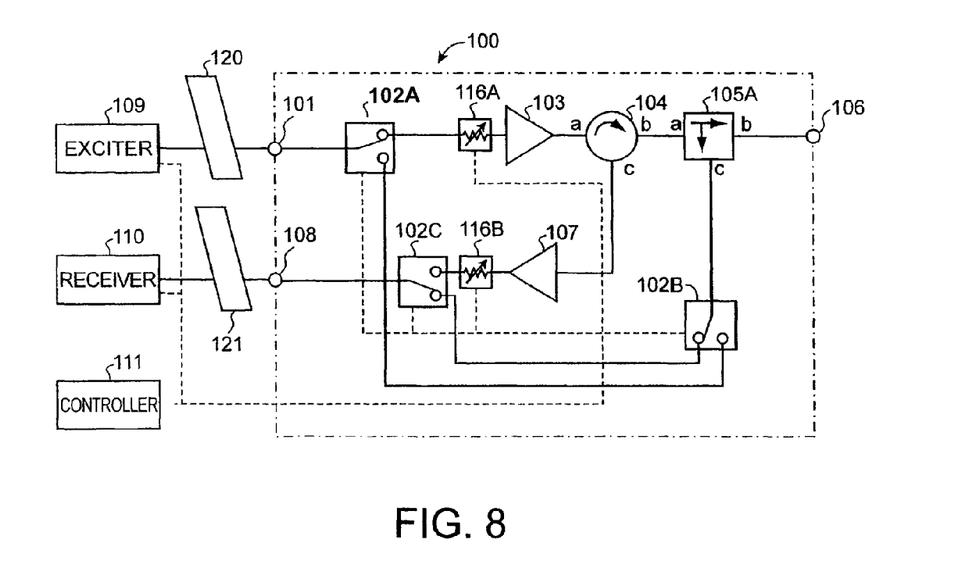
FIG. 8 is a block diagram showing a circuit structure of a transmit/receive module according to a eighth embodiment.

FIG. 8 shows the transmit/receive module according to the eighth embodiment. In transmit/receive module 100, controlling transmission and restraint of a signal is controlled by a variable attenuator instead of controlling operation of transmit amplifier 103 and receive amplifier 107 unlike the seventh embodiment shown in FIG. 7. As shown in FIG. 8 transmit/receive module 100 has first variable attenuator 116A, which is provided between first branch device 102A and transmit amplifier 103, and second variable attenuator 116B, which is provided between receive amplifier 107 and fourth branch device 102C. Resistance values of first variable attenuator 116A and second variable attenuator 116B are controlled electronically respectively.

First variable attenuator 116A is set to small resistance during transmission or monitoring of the transmit line, and a signal is transferred to transmit amplifier 103. During reception or monitoring of the receive line, first variable attenuator 116A is set to large resistance, and the signal is not transferred to transmit amplifier 103 at all or is attenuated to same level to this. Second variable attenuator 116B is set to large resistance during transmission or monitoring of the transmit line, and a signal outputted from receive amplifier 107 is not transmitted at all or is attenuated to the same level to this. During reception or monitoring of the receive line, second variable attenuator 116B is set to small resistance, and the signal is transmitted to fourth branch device 102C. First variable attenuator 116A and second variable attenuator 116B are controlled as mentioned above by controller 111. A position of second variable attenuator 116B is not limited to the embodiment, and it is necessary to place second variable attenuator 116B between transmit/receive separator 104 and receive output terminal 108.

Figure 9:
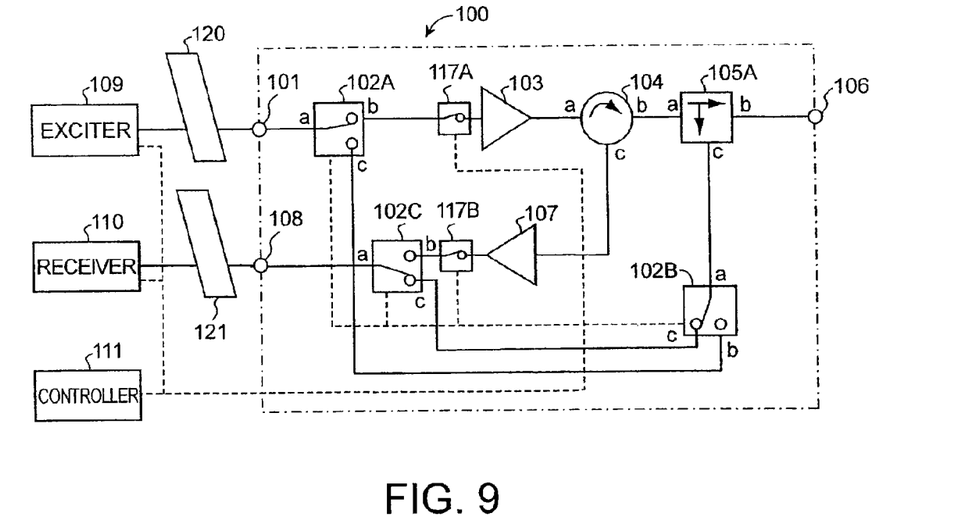
FIG. 9 is a block diagram showing a circuit structure of a transmit/receive module according to a ninth embodiment.

FIG. 9 shows the transmit/receive module according to ninth embodiment. In transmit/receive module 100, controlling of transmission and block of a signal is controlled by a switch, such as RF switch unlike the eighth embodiment shown in FIG. 8. Transmit/receive module 100 has first switch 117A provided between first branch device 102A and transmit amplifier 103 and second switch 117B provided between receive amplifier 107 and fourth branch device 102C. Controlling of transmission and block of the signal by switches 117A and 117B is controlled electronically.

First switch 117A is ON during transmission or monitoring of the transmit line and the signal is transferred to transmit amplifier 103, and first switch 117A is OFF during reception or monitoring of the receive line and a signal transfer to transmit amplifier 103 is blocked. Second switch 117B is OFF during transmission or monitoring of transmit line and the signal transfer to fourth branch device 102C is blocked, and second switch 117B is ON during reception or monitoring of the receive line and the signal is transferred to fourth branch device 102C. First switch 117A and second switch 117B are controlled as mentioned above by controller 111.

As mentioned above in the transmit/receive module according to each embodiment, during monitoring of the transmit line, the signal is inputted to transmit input terminal 101 via the power distributor 120 and a part of the signal is outputted to receive terminal 108 via the first branch device, the transmit/receive separator, and further via the second branch device, the third branch device and the fourth apparatus, is measured by receiver 110 or the measurement apparatus connected to receive output terminal 108 via power combiner 121. During monitoring of the receive line, the signal is inputted to transmit input terminal 101 via power distributor 120, and is outputted to receive output terminal 108 via the first branch device, third branch device, the second branch device, and transmit/receive separator, and further via the fourth branch device, and is measured by receiver 110 or the measurement apparatus via power combiner 121. That is, since the input signal is inputted into transmit input terminal 101 and output signal is outputted to receive output terminal 108 during monitoring of the transmit line or monitoring of the receive line, the transmit/receive module is not required an input/output terminal for monitor use only. A power distributor/combiner is also unnecessary and reduction in size and weight of the radar apparatus can be realized.

Next, transmit/receive modules according to the embodiments having plural receive amplifiers and receive output terminals will be explained.

Figure 10:
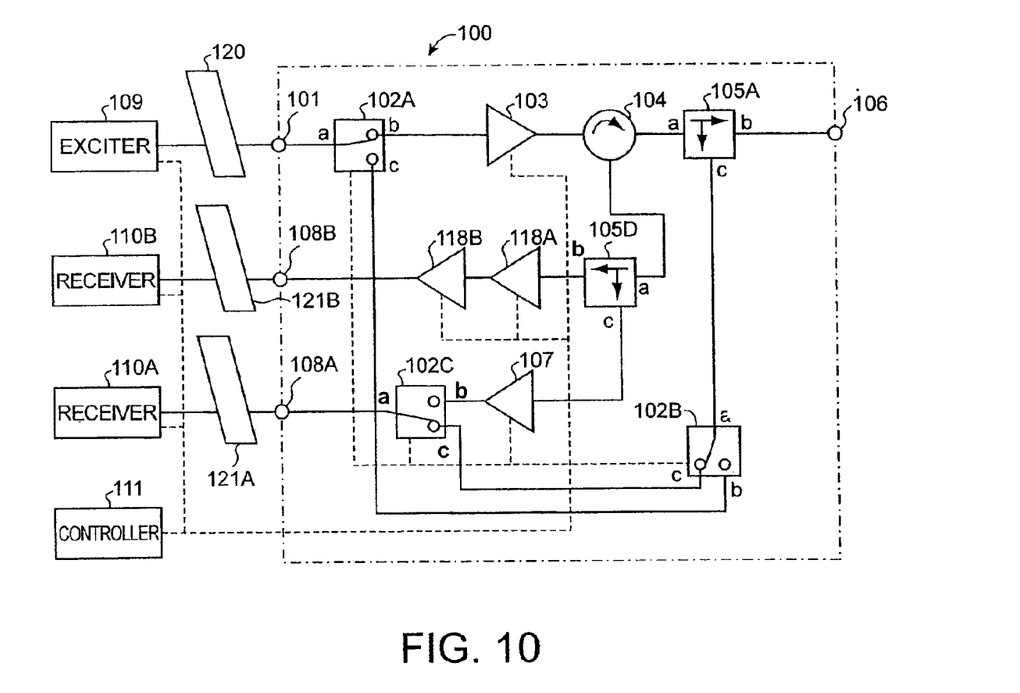
FIG. 10 is a block diagram showing a circuit structure of a transmit/receive module according to a tenth embodiment.
Figure 11:
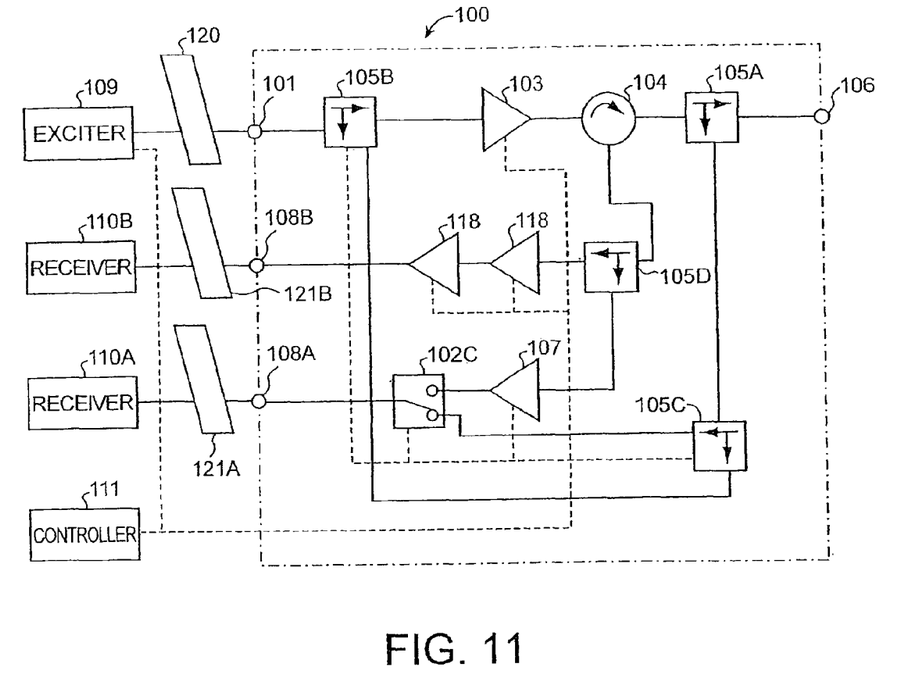
FIG. 11 is a block diagram showing a circuit structure of a transmit/receive module according to a eleventh embodiment.

In transmit/receive modules according to the tenth embodiment and the eleventh embodiment shown in FIG. 10 and FIG. 11, the same numerals denote the same portions of the transmit/receive module shown in FIG. 1 and FIG. 2, and a detailed explanations of those elements are omitted.

FIG. 10 shows the transmit/receive module according to the tenth embodiment. In transmit/receive module 100, transmit input terminal 101 is connected to common terminal a of first branch device 102A, which braches inputted signal into two directions, terminal b of first branch device 102A is connected to transmit amplifier 103, transmit amplifier 103 is connected to terminal a of transmit/receive separator 104, in which a terminal outputting a signal is changed according to a terminal inputted with the signal, and further terminal b of transmit/receive separator 104 is connected to terminal a of second branch device 105A, and moreover terminal b of second branch device 105A is connected to transmit output/receive input terminal 106.

Furthermore terminal c of second branch device 105A is connected to terminal a of third branch device 102B and terminal b of third branch device 102B is connected to terminal c of first branch device 102A, and terminal c of third branch device 102B is connected to terminal c of fourth branch device 102C.

Terminal c of transmit/receive separator 104 is connected terminal a of fifth branch device 105D. Terminal c of fifth branch device 105D is connected to first receive amplifier 107, and output of first receive amplifier 107 is connected to terminal b of fourth branch device 102C. Common terminal a of fourth branch device 102C is connected to first receive output terminal 108A, and first receive output terminal 108A is connected to first receiver 110A via power combiner 121A. Further, terminal b of fifth branch device 105D is connected to, for example, series connection of two second receive amplifiers 118A, 118B, output of second receive amplifier 118B is connected to second receive output terminal 108B and second receive output terminal 108B is connected to second receiver 110B via power combiner 121B.

In transmit/receive module 100 according to this embodiment, second branch device 105A and fifth branch device 105D are directional couplers, first branch device 102A, third branch device 102B and fourth branch device 102C are RF switches, and transmit/receive separator 104 is a circulator.

In this case, during a transmitting mode, a configuration becomes as follows: A transmit circuit is configured by a circuit of exciter 109-power distributor 120-transmit input terminal 101-first branch device 102A-transmit amplifier 103-transmit/receive separator 104-second branch device 105A-transmit output/receive input terminal 106. Common terminal a of first branch device 102A is connected to terminal b, common terminal a of third branch device 102B is connected to terminal b, and common terminal a of fourth branch device 102C is connected to terminal b.

When the first receive amplifier is used, the receive circuit becomes as follows: The first receive circuit is configured by a circuit of transmit output/receive input terminal 106-second branch device 105A-transmit/receive separator 104-fifth branch device 105D-first receive amplifier 107-fourth branch device 102C-first receive output terminal 108A-power combiner 121A-first receiver 110A. In this case, common terminal a of first branch device 102A is connected to terminal c, common terminal a of third branch device 102B is connected to terminal c, and common terminal a of fourth branch device 102C is connected to terminal b.

When the second receive amplifier is used, the receive circuit becomes as follows: In receiving operation using first receiver, a receive signal is branched by fifth branch device 105D and is also inputted to second receive amplifier 118A as well as the first receive amplifier 107. In a circuit structure after fifth branch device 105D, the second receive circuit is configured by a circuit of fifth branch device 105D-second receive amplifier 118A-second receive amplifier 118B-second receive output terminal 108B-power combiner 121B-second receiver 110B.

When the transmit line is monitored, a circuit is configured as follows: A transmit line monitoring circuit is configured by a circuit of exciter 109-power distributor 120-transmit input terminal 101-first branch device 102A-transmit amplifier 103-transmit/receive separator 104-second branch device 105A-third branch device 102B-fourth branch apparatus 102C-receive output terminal 108A-power combiner 121A-first receiver 110A. In this case, common terminal a of first branch device 102A is connected to terminal b, common terminal a of third branch device 102B is connected to terminal c, and common terminal a of fourth branch device is connected to terminal c.

When the receive line is monitored, a circuit is configured as follows: A receive line monitoring circuit is configured by a circuit of exciter 109-power distributor 120-transmit input terminal 101-first branch device 102A-third branch device 102B-second branch device 105A-transmit/receive separator 104-fifth branch device 105D-first receive amplifier 107-fourth branch device 102C-receive output terminal 108A-power combiner 121A-first receiver 110A. In this case, common terminal a of first branch device 102A is connected to terminal c, common terminal a of third branch device 102B is connected to terminal b, and common terminal a of fourth branch device 102C is connected to terminal b.

When monitoring the receive line using second receiver 110B, a circuit after fifth branch device 105D includes a circuit of second receive amplifier 118A-second receive amplifier 118B-second receive output terminal 108B-power combiner 121B-second receiver 110B. The receive line monitoring circuit is configured as above.

According to above mentioned structure, the transmit/receive module is not required the input/output terminal only for a monitor apparatus, as well as the transmit/receive modules according to the embodiments 1 though 9. Thereby the power distributor/combiner only for the monitor becomes unnecessary, there is a benefit that reduction in size and weight of radar apparatus is possible. Furthermore, since the transmit/receive module has two receive amplifiers 118A, 118B connected in series and second receive output terminal 108B, a weak signal can be received. Particularly in radar apparatus, when a weak signal reflected from an object in the distance is received, the second receive output terminal 108B connected to two stages of amplifiers 118A, 118B connected in series is used, and when a strong signal reflected from an object in the local is received, first receive output terminal 108A connected to one stage of receive amplifier 107 is used. Thereby a reflection signal from the local can be received by receiver 110A and a reflection signal from the distance can be received by receiver 110B, and both signals from the local and the distance can be received.

FIG. 11 shows a transmit/receive module according to the eleventh embodiment. In transmit/receive module 100, first branch device 105B, second branch device 105A, third branch device 105C and fifth branch device 105D are a directional coupler respectively, fourth branch device 102C is an RF switch, transmit/receive separator 104 is a circulator. Also in this embodiment, both or either of transmit amplifier 103 and receive amplifier 107 can be omitted.

Other embodiments or modifications of the present invention will be apparent to those skilled in the art from consideration of the specification and practice of the invention disclosed herein. It is intended that the specification and example embodiments be considered as exemplary only, with a true scope and spirit of the invention being indicated by the following.

What is claimed is:

1. A transmit/receive module having a transmit line and a receive line, comprising:
    a transmit input terminal for inputting a transmit input signal;
    a receive output terminal for outputting a receive output signal;
    a transmit output/receive input terminal for outputting a transmit signal and receiving a receive signal;
    a first branch device connected to the transmit input terminal;
    a transmit/receive separator connected to the first branch device;
    a second branch device connected to the transmit/receive separator;

a third branch device connected to the first branch device and the second branch device; and a fourth branch device connected to the third branch device, the receive output terminal and the transmit/receive separator;

wherein the first branch device, the second branch device, the third branch device, the fourth branch device and the transmit/receive separator are configured so that when the transmit line is monitored, a signal inputted to the transmit input terminal is outputted to the receive output terminal through the first branch device, the transmit/receive separator, the second branch device, the third branch device and the fourth branch device in order, and when the receive line is monitored, the signal inputted to the transmit input terminal is outputted to the receive output terminal through the first branch device, the third branch device, the second branch device, the transmit/receive separator, and the fourth branch device in order.

2. The transmit/receive module according to claim 1, further comprising:

a transmit amplifier provided between the first branch device and the transmit/receive separator.

3. The transmit/receive module according to claim 1, further comprising:

a receive amplifier provided between the transmit/receive separator and the fourth branch device.

4. The transmit/receive module according to claim 1, further comprising:

a transmit amplifier provided between the first branch device and the transmit/receive separator; and a receive amplifier provided between the transmit/receive separator and the fourth branch device.

5. The transmit/receive module according to claim 4, wherein the transmit amplifier is controlled so as to operate during transmitting or monitoring the transmit line, and not to operate during receiving or monitoring the receive line, and the receive amplifier is controlled so as not to operate during transmitting or monitoring of the transmit line, and to operate during receiving or monitoring of the receive line.

6. The transmit/receive module according to claim 4, further comprising:

a first switch provided between the first branch device and the transmit amplifier, and a second switch provided between the receive amplifier and the receive output terminal;

wherein the first switch controls transmission/blocking of a signal to the transmit amplifier and the second switch controls transmission/blocking of a signal outputted from the receive amplifier.

7. The transmit/receive module according to claim 1, further comprising:

a second receive output terminal for outputting a second output signal;

a fifth branch device provided between the transmit/receive separator and the receive amplifier; and a plurality of second receive amplifiers in-series connection provided between the fifth branch device and the second receive output terminal.

8. The transmit/receive module according to claim 1, wherein one of the first branch device, the second branch device, the third branch device and the fourth branch device is a directional coupler.

9. The transmit/receive module according to claim 1, wherein one of the first branch device, the second branch device, the third branch device and the fourth branch device is an RF switch.

10. The transmit/receive module according to claim 1, wherein one of the first branch device, the second branch device, the third branch device and the fourth branch device is a distributor.

11. The transmit/receive module according to claim 1, wherein the transmit/receive separator includes a circulator.

12. The transmit/receive module according to claim 1, wherein the transmit/receive separator includes two circulators of which rotational directions are different from each other.

13. The transmit/receive module according to claim 1, wherein the transmit/receive separator includes an RF switch.

14. The transmit/receive module according to claim 1, further comprising:

a phase shifter provided between the transmit input terminal and the transmit/receive separator.

15. The transmit/receive module according to claim 5, wherein operation of the transmit amplifier and the receive amplifier is controlled by bias voltages applied respectively.

16. The transmit/receive module according to claim 15, further comprising:

a first variable attenuator provided between the first branch device and the transmit amplifier, and a second variable attenuator provided between the receive amplifier and the receive output terminal;

wherein the first attenuator controls transmission of a signal and attenuation of the signal to the transmit amplifier and the second attenuator controls transmission of a signal and attenuation of the signal outputted from the receive amplifier.

17. A transmit/receive module, comprising:

a transmit input terminal for inputting a transmit signal;

a receive output terminal for outputting a receive signal;

a transmit output/receive input terminal for outputting the transmit signal and receiving the receive signal;

a transmit circuit having a first branch device connected to the transmit input terminal, a transmit amplifier for amplifying an inputted signal connected to the first branch device, a transmit/receive separator connected to the transmit amplifier and a second branch device connected to the transmit/receive separator, wherein the transmit circuit is configured to amplify the transmit signal inputted to the transmit input terminal and output an amplified transmit signal to the transmit output/receive input terminal during transmitting, a receive circuit having the second branch device, the transmit/receive separator, a receive amplifier for amplifying an inputted signal and a circuit connecting the receive amplifier and the receive output terminal, wherein the receive circuit is configured to amplify the receive signal inputted to the transmit output/receive input terminal, and output an amplified receive signal to the receive output terminal during receiving, a transmit line monitor circuit having the first branch device connected to the transmit input terminal, the transmit amplifier for amplifying the inputted signal connected to the first branch device, the transmit/receive separator connected to the transmit amplifier, the second branch device connected to the transmit/receive separator and the transmit output/receive input terminal, a third branch device connected to the second branch device, and a circuit connecting the third branch device and the receive output terminal, wherein the transmit line monitor circuit is configured to amplify a standard signal inputted to the transmit input terminal and output an amplified standard signal to the receive output terminal through the second branch device and the third branch device when the transmit line is monitored, and a receive line monitor circuit having the first branch device connected to the transmit input terminal, the third branch device connected to the first branch device, a second branch device connected to the third branch device, the transmit/receive separator connected to the second branch device, the receive amplifier connected to the transmit/receive separator, and a circuit connecting the receive amplifier and the receive output terminal, wherein the receive line monitor circuit is configured to branch the standard signal inputted to the transmit input terminal to the third branch device by the first branch device, and to amplify the standard signal through the transmit/receive separator and the second branch device by the receive amplifier and to output the amplified standard signal to the receive output terminal when the receive line is monitored.

* * * * *